United States Patent [19]

Rajnik

[11] Patent Number: 4,605,429

[45] Date of Patent: Aug. 12, 1986

[54] TRIMMING PRODUCTS FROM SHEET GLASS

[75] Inventor: Lawrence S. Rajnik, Corning, N.Y.

[73] Assignee: Corning Glass Works, Corning, N.Y.

[21] Appl. No.: 731,362

[22] Filed: May 7, 1985

[51] Int. Cl.[4] ............................................. C03B 11/00
[52] U.S. Cl. .......................................... 65/105; 65/70; 65/112; 65/97
[58] Field of Search .................. 65/105, 70, 112, 97, 65/177

[56] References Cited

U.S. PATENT DOCUMENTS

| | | |
|---|---|---|
| 2,840,952 | 7/1958 | Soubier ................................. 65/177 |
| 3,193,367 | 6/1965 | Giffen . |
| 3,582,454 | 6/1971 | Giffen . |
| 4,261,706 | 4/1981 | Blanding et al. . |
| 4,361,429 | 11/1982 | Anderson et al. ................. 65/70 X |

Primary Examiner—Arthur Kellogg
Attorney, Agent, or Firm—B. R. Turner

[57] ABSTRACT

A method is disclosed for trimming a newly formed article from sheet glass while it is still in a semi-molten condition, by maintaining a peripheral portion of the sheet glass about the newly formed article out of contact with the mold so as to maintain its temperature, and then reducing the thickness of such peripheral portion without severing the same, and then cooling the thinned section to thermally crack-off and separate the newly formed article from the sheet glass.

10 Claims, 4 Drawing Figures

TRIMMING PRODUCTS FROM SHEET GLASS

BACKGROUND OF THE INVENTION

The present invention relates to glass forming and trimming, and is an improvement to the inventions disclosed in Giffen U.S. Pats. No. 3,193,367 and 3,582,454. The former patent was directed to the problems encountered in trimming a newly formed article from surrounding sheet glass before the glass became chilled. The sheet was maintained in a spaced relationship from a wall of the forming die, which served as one trimmer edge, so as to minimize the cooling effect of the die on the sheet glass. The sheet was sheared by a trimmer slidably cooperating with the trimmer edge of the die. The latter patent was directed to the trimming of a laminated sheet so as to force an outer stratum over a central stratum of the laminate during the trimming operation.

U.S. Pat. No. 4,261,706 to Blanding et al relates to the use of a pair of cooperable rollers to form a plurality of uniform particles from molten material. The particles are initially joined together by thin web or edge portions within a sheet form, which is subsequently flexed in various directions to separate the particles along the edge or web portions.

In the past, the trimming techniques utilized for sheet glass required rather precise tolerances between the mold trim edge and the trimming tool, since the glass was sheared as the trimming tool cooperably slid along the trim edge, as shown in FIG. 1 and the above identified Giffen patents. Thus, as shown in FIG. 1, the critical dimension d in the operation was the dimension of the clearance between the trim edge 12 of the mold 10 and the trimmer 14. The necessary tolerances between the trimmer and the mold trim edge can usually be maintained within acceptable limits when the product to be trimmed is round by thermal sizing the parts. However, when a non-round trim is required, matching the tooling at the forming temperatures is extremely difficult since thermal size changes are not uniform. That is, since the sliding fit between the trimmer 14 and the mold trim edge 12 must be achieved at forming temperatures, the operating temperatures and behavior of the materials as they heat up must be known in order to accomplish the desired operable sliding fit. However, if the operating temperature change or the material behavior has not been accurately predicted, the critical dimension d will not be maintained, and the trimming will not function correctly due to either a binding or a loose fit between the trimmer parts 12 and 14.

When the product to be trimmed is round, a poor fit represented by the sliding clearance between the trimmer and the mold edge is not necessarily a serious problem since the fit can be adjusted with reasonable changes in tooling temperatures. However, when the product is not round, the problem becomes more serious since the longer mold dimension of the product to be trimmed changes a greater amount than the shorter dimension, and since the change is not necessarily uniform, it may result in an unacceptable trimming of the glass sheet G.

SUMMARY OF THE INVENTION

The present invention relates to method and apparatus for trimming newly formed articles, of virtually any shape, from sheet glass while in a semi-molten condition, without being concerned about conventional tolerances between shearing elements. The peripheral region of the article to be trimmed from the sheet glass is suspended over a groove or recess, which prevents rapid cooling of the glass in such area. A trimmer is inserted into the glass within the region of the groove or recess, such that the glass thickness is preferably reduced to about 0.015 inches or thinner, and cracks occur in the thin section as a result of cooling and minute stress sources introduced by the tooling. The cracks, of course, follow the groove and the product is then separated from the sheet as it cools.

DESCRIPTION OF THE PREFERRED EMBODIMENTS

Figure 2:
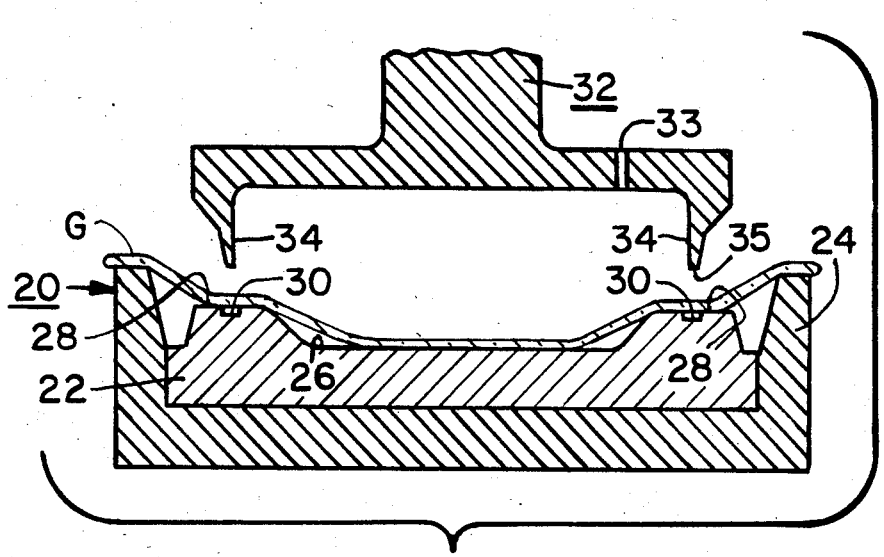
FIG. 2 is a schematic elevational view in section illustrating the positionment of a sheet of molten glass upon a mold assembly for forming and trimming.

Referring now to the drawings, and particularly FIG. 2, a glass sheet G is shown overlying a mold assembly 20 comprising a mold insert 22 and a mold housing 24. The mold insert 22 is provided with a forming surface which may be in the form of a mold cavity 26 having a surrounding rim 28 provided with a groove or recess 30 extending about the periphery P of the article A formed by the mold 22. The glass sheet G is shown positioned over the mold asembly 20 in FIG. 2, whereas, in FIG. 3, it is shown formed into an article A within the mold cavity 26. The glass sheet G may either be of a unitary composition as shown by Giffen U.S. Pat. No. 3,193,367, or may be in the form of a laminate as shown by Giffen, U.S. Pat. No. 3,582,454. In addition, the article A may be formed by any desired process such as pressing, vacuum forming, blowing, or a combination of the same.

A trimmer head 32, reciprocal with respect to the mold assembly 20, is provided with a tapered trimmer portion 34 which terminates in a blunt trimmer edge 35. The trimmer edge is in cooperable alignment with the recess 30 formed in upper rim 28. In operation, the glass sheet G is formed into an article A on the mold 22. The sheet G overlies the grooves or recess portions 30 adjacent the periphery P of the article A, so as to maintain such peripheral area out of contact with the metal mold and retain the glass in such peripheral area at or near the forming temperature until the initiation of the trimming operation. After the article A is formed, the trimmer and mold assembly are relatively moved toward one another so that the tapered trimmer portion 34 and trimmer edge 35 moves into the glass sheet G, reducing the thickness of the glass in the trim region, which is defined by the width of the trimmer edge 35 in cooperation with groove or recess 30. The trimmer head 32 may be provided with a vent opening 33 to relieve air pressure generated between the trimmer head and the hold 22. The glass thickness within the groove is reduced to form a thin connection section 36 having a maximum thickness of about 0.02", and a crack or plurality of cracks C occur in such thin section as a result of cooling and minute stress sources introduced by the trimming operation. The cracks C follow the groove 30 about the periphery P of the article A, and the article is separated and removed from the sheet as it cools.

As noted, the trimming operation is accomplished without the trimmer portion 34 sliding past a trim edge of a mold. In fact, the reduced glass thickness, which results in the trimming, is produced by parallel surfaces moving toward one another. Tha is, so long as the trimmer edge 35 on tapered trimmer portion 34 is aligned within the width of mold groove 30, the trimming will be successful, since the trimmer edge 35 and the inner surface of the groove 30 will be cooperably aligned. Further, since the width of the groove 30 may be made much larger than the bottom trimmer edge 35 of the tapered trimmer portion 34, the problem of alignment and fit between the trimmer and the groove is greatly reduced from that encountered with the sliding fit of the prior art.

As previously mentioned, the reduction of the thickness in the glass sheet prduced by the trimmer portion should be such so that the thickness of the reduced peipheral portion within the groove 30 does not exceed about 0.02 inches. In fact, although separation has been achieved with a thickness of 0.02 inches, reliable performance occurs when the thickness of the critical dimension D between the trimmer edge 35 and the inner surface of the groove 30 is below 0.015 inches. The separation is affected by the amount of expansion of the glass, such that higher expansion glasses separate more readily from the sheet than lower expansion glasses. After the tapered trimmer portion 34 has reduced the thickness of the glass to the desired critical dimension D, the trimmer 32 is withdrawn, and as the glass cools, thermal crack-off causes the article to separate from the sheet. However, it is desireale that the sheet G surrounding the article A has some resistance to the aricle so as to establish stresses in the crack region, such as by mechanically locking the sheet G to the mold housing 24, or by retaining the sheet by means of vacuum, or by merely cooling the sheet. After the article is separated, it is removed from the sheet.

Figure 1:
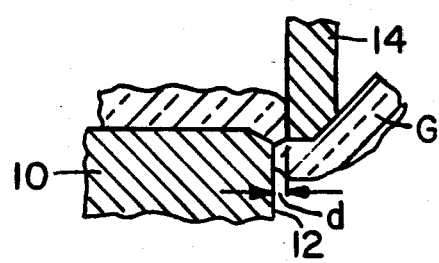
FIG. 1 is a schematic fragmental elevational view in section illustrating the prior art method of trimming sheet glass adjacent the rim edge of a mold.
Figure 4:
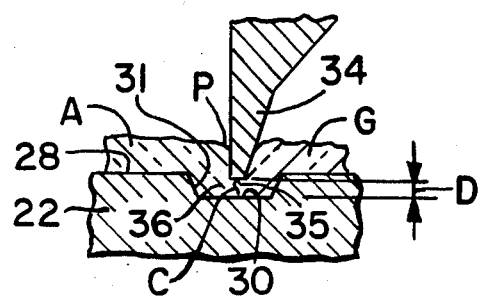
FIG. 4 is an enlarged schematic fragmental sectional view in elevation illustrating the trimming operation of the present invention.

The length of the tapered portion 34 of the trimmer is greater than the thickness of the sheet G to be trimmed, and the nose or trimmer edge 35 of the tapered trimmer portion 34 may have a width of between about 0.01 and 0.02 inches, which cooperates with a groove having a width of about 0.1 inches. The depth of the groove 30 may be between about 0.01 inches and 0.015 inches. It is understood, of course, that greater widths could be utilized with possible increases in depths. Further, it is important that the groove sides 31 (FIG. 4) have an upward and outward slope to prevent the locking of the glass in the groove.

The temperature of the trimmer must, of course, be maintined below the metal to glass sticking temperature. Trimming pressures of about 280 lbs per square inch along the trimmer edge function satisfactorily for most sheet glass having a thickness not exceeding about ¼ inch. The width and depth of the groove 30 are actually selected to maintain the sheet suspended over the bottom of the groove so as to prevent contact with the mold and retain the glass close to the forming temperature at the time it is contacted by the trimmer.

Figure 3:
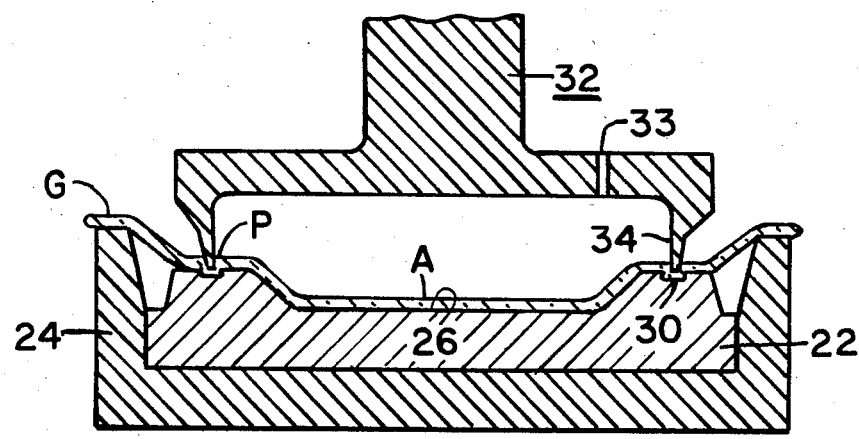
FIG. 3 is a schematic elevational view in section illustrating the trimming of an article formed from the sheet glass and mold of FIG. 2, incorporating the present invention.

In addition to having the trimmer of the present invention simultaneously fully operable in the same plane as the mold as shown in FIG. 3, the trimmer edge could be formed on the outside surface of a cylinder, to progressively engage a peripherial groove. That is, as the cylinder rotates, the trimmer would match a groove formed in the outside surface of the mold and progressively trim out the article as it rotates along the groove. The reduced sensitivity to dimensional tolerances of the trim concept of the present invention is beneficial for virtually all configurations on a rotary trimmer.

Although each mold is shown containing only one product centrally located in the mold, it is possible to produce several products in a mold and still utilize the trim concept of the present invention, since its reduced sensitivity to trimming tolerances makes it possible to trim a plurality of products from a single mold. Further, it is unimportant whether the article is vaccum formed, press formed or a combination of both, since the trimming concept of the present invention is applicable in separating a formed article from sheet glass irrespective of the manner in which it is formed. Further, the sheet glass may either be unitary or laminated glass, as may be desired for the finished product. Further, if desired, the surface of the trimmer could be provided with irregularities which would raise the stress levels in the trim area and promote checks to form along the groove for thus enhancing the separation of the article from the sheet.

Although the now preferred embodiments of the invention have been disclosed, it will be apparent to those skilled in the art that various changes and modifications may be made thereto without departing from the spirit and scope thereto as defined in the appended claims.

I claim:

1. A method of separating a newly formed article from sheet glass while still in a semi-molten condition which comprises:
    suspending the sheet glass over a shallow groove adjacent the periphery of the formed article,
    initially maintaining the suspended portion of said sheet glass out of contact with surface portions of said groove and thus inhibiting the loss of heat from such peripheral portion through conduction,
    forcing said suspended portion of said sheet into said groove and reducing the thickness of the sheet within the groove between the article and the remainder of the sheet,
    terminating the reduction in thickness of the sheet within the peripheral groove while maintaining a thin integral connection section between the article and the remainder of the sheet,
    and cooling said thin section to cause a thermal crack-off separation between the article and the remainder of the sheet along said thin section within said shallow groove.

2. A method of separating a newly formed article from sheet glass while still in a semi-molten condition as defined in claim 1 including the step of reducing the thickness of the sheet within the groove to an extent such that the thickness of said thin integral connecting section does not exceed about 0.02".

3. A method of separating a newly formed article from sheet glass while still in a semi-molten condition as defined in claim 1 including the steps of aligning a trimmer edge with said shallow groove, and relatively moving said trimmer edge with respect to said groove for engaging said suspended peripheral portion of said sheet and reducing the thickness of the same within the groove to form the thin integral connection section between the article and the remainder of the sheet.

4. A method of separating a newly formed article from sheet glass while still in a semi-molten condition as defined in claim 3 including the step of solidifying the glass sheet between said trimmer edge and an inner surface of said shallow groove to form said thin integral connection section between the article and the remainder of the sheet.

5. A method of separating a newly formed article from sheet glass while still in a semi-molten condition as defined in claim 4 including the step of introducing minute stress sources within said thin integral connection section during the relative movement of said trimmer edge with respect to said groove.

6. A method of separating a newly formed article from sheet glass while still in a semi-molten condition as defined in claim 5 including the step of producing cracks along said thin integral connection section within said shallow groove upon the cooling of said thin section, which cooling interacts with said stress sources to separate the article from the remainder of the sheet.

7. A method of separating a newly formed article from sheet glass while still in a semi-molten condition as defined in claim 3 including the step of relatively moving said trimmer edge with respect to said groove so as to reduce the thickness of the sheet within the grove between the article and the remainder of the sheet to an extent such that the thin integral connection section has a thickness of less than 0.015".

8. A method of separating a newly formed article from sheet glass while still in a semi-molten condition as defined in claim 1 including the steps of positioning a sheet of semi-molten glass over a mold,
forming an article within a mold cavity surrounded by a shallow groove,
moving a trimmer edge into engagement with semi-molten glass overlying said groove and reducing the thickness thereof to form a thin section having a maximum thickness of 0.015" without separating the article from the remainder of the sheet glass,
removing the trimmer edge from the groove area,
and cooling the thin section within said groove to form cracks along the groove within the thin section and separate the article from the remainder of the sheet as it cools.

9. A method of separating a newly formed article from sheet glass while still in a semi-molten condition as defined in claim 8 including the step of retaining the sheet in position with respect to the mold to provide resistance between the article and the sheet to establish stresses in the region of the thin section and enhance the separation of the article from the sheet.

10. A method of trimming an article from sheet glass while the glass is still in a semi-molten condition which comprises:
positioning a sheet of semi-molten glass on a forming surface,
suspending a peripheral portion of said sheet glass out of contact with said forming surface over a groove extending peripherally about said forming surface,
forming an article on said forming surface,
moving a blunt trimmer into said groove and reducing the thickness of the peripheral sheet glass suspended over said groove to form a thin section, and
breaking the shaped sheet along the thin section to effect a separation between the newly formed article and the remainder of the sheet glass.

* * * * *